US007886841B2

(12) United States Patent
Armstrong

(10) Patent No.: US 7,886,841 B2
(45) Date of Patent: Feb. 15, 2011

(54) POWER TOOL TORQUE OVERLOAD CLUTCH

(75) Inventor: Jonathan Armstrong, Oakenshaw Crook (GB)

(73) Assignee: Black & Decker Inc., Newark, DE (US)

( * ) Notice: Subject to any disclaimer, the term of this patent is extended or adjusted under 35 U.S.C. 154(b) by 232 days.

(21) Appl. No.: 11/377,013

(22) Filed: Mar. 16, 2006

(65) Prior Publication Data

US 2006/0207775 A1 Sep. 21, 2006

(30) Foreign Application Priority Data

Mar. 18, 2005 (GB) ................................ 0505457.2
Jul. 29, 2005 (GB) ................................ 0515576.7

(51) Int. Cl.
*F16D 7/06* (2006.01)

(52) U.S. Cl. ......................... 173/176; 173/217; 173/47; 173/48; 173/201; 173/109; 173/216; 192/56.1; 192/56.5; 192/56.6

(58) Field of Classification Search ................... 173/47, 173/48, 201, 109, 216, 176; 192/56.1, 56.5, 192/56.6
See application file for complete search history.

(56) References Cited

U.S. PATENT DOCUMENTS

| | | | | |
|---|---|---|---|---|
| 2,911,841 | A * | 11/1959 | Miller | 74/342 |
| 3,396,593 | A * | 8/1968 | Moores, Jr. | 74/371 |
| 3,442,360 | A * | 5/1969 | Fulop | 192/56.61 |
| 3,686,957 | A | 8/1972 | Kim et al. | |
| 3,827,260 | A * | 8/1974 | Kato | 464/35 |
| 4,041,729 | A * | 8/1977 | Bilz | 192/56.5 |
| 4,113,035 | A * | 9/1978 | Stiltz et al. | 173/201 |
| 4,418,766 | A * | 12/1983 | Grossmann | 173/13 |
| 4,694,944 | A * | 9/1987 | Schmidt | 192/56.5 |
| 4,710,071 | A * | 12/1987 | Koehler et al. | 408/133 |
| 4,823,885 | A * | 4/1989 | Okumura | 173/178 |
| 5,005,684 | A * | 4/1991 | Fujii | 192/56.57 |
| 5,019,023 | A * | 5/1991 | Kurosawa | 475/269 |
| 5,346,023 | A * | 9/1994 | Takagi et al. | 173/178 |
| 5,616,080 | A * | 4/1997 | Miescher | 464/35 |
| 5,775,440 | A * | 7/1998 | Shinma | 173/109 |
| 5,992,257 | A * | 11/1999 | Nemetz et al. | 74/371 |
| 2004/0026099 | A1* | 2/2004 | Stirm | 173/178 |

FOREIGN PATENT DOCUMENTS

| | | |
|---|---|---|
| DE | 25 22 446 | 12/1976 |
| DE | 38 32 202 | 3/1990 |
| DE | 39 42 806 | 6/1991 |
| DE | 101 31 220 | 3/2003 |
| EP | 0 608 083 | 7/1994 |
| GB | 1 095 067 | 12/1967 |
| GB | 1 206 853 | 9/1970 |
| GB | 2 069 073 | 8/1981 |
| WO | WO 2004/024398 | 3/2004 |

* cited by examiner

*Primary Examiner*—Rinaldi I. Rada
*Assistant Examiner*—Michelle Lopez
(74) *Attorney, Agent, or Firm*—Scott B. Markow

(57) ABSTRACT

A torque overload clutch for an electrical power tool, such as a percussion hammer drill, is provided. The clutch is accommodated in a cavity in a gear cog. Spring washers are used to urge ball bearings into indentations formed in the base of the cavity. The ball bearings are accommodated in cavities formed in a drive plate which engages with the spindle drive of the power tool. The spring washers are held in position by a circlip or a threaded plate. The threaded plate arrangement provides means for compressing the spring washers with a consistent force across a manufactured batch. A method of manufacturing the clutch is also disclosed.

9 Claims, 3 Drawing Sheets

POWER TOOL TORQUE OVERLOAD CLUTCH

FIELD OF THE INVENTION

The present invention relates to a torque overload clutch which is suited for use in power tools, especially electrically powered hammer drills. The present invention also relates to a power tool comprising such a clutch mechanism.

BACKGROUND OF THE INVENTION

Embodiments of the invention are described below with reference to hammer drills. However, the inventive concept is not limited to such devices and a clutch embodying the invention can equally find use in other power tools such as circular saws or grinders, for instance.

During normal operation of a hammer drill a drill bit is caused to rotate whilst, at the same time, the drill bit receives repeated impacts. Such drills are often used for working masonry, or the like. The impact mechanism can be of a pneumatic or percussion type, known in the art. Furthermore, the hammer drill can be arranged to operate in hammer-drill mode, where the drill bit receives impacts as it rotates, and drill mode, where the impact mechanism is disengaged resulting in the drill bit rotating without receiving impacts. Often, hammer drill tools are provided with a hammer-only mode, for use with chisel tools, where the tool receives a series of impacts but does not rotate.

It is desirable to provide a torque overload clutch mechanisms in a rotary hammer drill which can interrupt drive from the drill's motor when a torque force exceeding a predetermined torque is applied to a tool bit. Such a clutch mechanism is particularly desirable for relatively powerful hammer drills. The clutch and associated predetermined torque should be arranged such that the drill operates normally as the drill bit engages a work-piece. However, if the drill bit becomes blocked or jammed in the work-piece then a torque force exceeding the predetermined torque is applied to the clutch, causing the clutch to operate or ratchet and interrupt power from the motor to the hammer drill output. If this situation occurs in a relatively powerful hammer drill which is not provided with such a clutch, then the motor would continue to apply power to the drill bit causing the hammer drill body to rotate relative to the work-piece. Furthermore, in a device which operates without a clutch, the motor might stall, or components of the drive train or gearbox might become dislocated causing damage or high levels of wear to themselves or other mechanisms.

A clutch mechanism for a pneumatic hammer drills has been proposed in WO2004/024398. In the arrangement described, the clutch is arranged on a driven gear, between the motor's gear and a bevel pinion which is arranged to mesh with a spindle's drive gear.

DE2522446 describes a handheld power tool which comprises an intermediate shaft with two fixed drive gears having different parameters. The gears cooperate with a spindle gear arrangement consisting of a large diameter gear wheel and a small diameter gear wheel. The small diameter gear wheel is press fitted on to a cylindrical projection of the large diameter gear wheel which is disposed on an inner sleeve element such that it can move with respect to the sleeve and so that an output spindle is formed. The output spindle is non-rotatably, but axially displaceably mounted on the tool spindle by means of the sleeve element. A ring element comprising clutch teeth is fixedly secured to the rear end of the sleeve and positioned within a recess formed by the inner circumferential surface the rear section of the gear wheel an end face of which comprises clutch teeth arranged to cooperate with the clutch teeth of the ring element. The clutch teeth are urged into engagement by springs disposed on the other end of the sleeve to the clutch teeth.

BRIEF SUMMARY OF THE INVENTION

Briefly, the present invention aims to provide a clutch mechanism suitable for, but not limited to, a hammer drill which is an improvement on known mechanism. The present invention also aims to provide an improved method of manufacture of a clutch. Furthermore, the present invention aims to improve on the prior art clutches by providing a compact clutch which can operate at higher torque forces than prior art clutch mechanisms.

More specifically, embodiments of the present invention provide an electrically powered tool comprising a motor for driving an output spindle through a torque overload clutch arranged to interrupt power between the motor and output spindle when a torque force is applied to the output spindle which exceeds a predetermined torque, said torque overload clutch comprising a spring arranged to urge a first and second component into engagement with one another with a predetermined force, the first and second component being in driving engagement with, or coupled to the motor and output spindle respectively, and a thrust plate arranged to maintain the spring in compression during use, wherein the thrust plate comprises coupling means for coupling the thrust-plate to the gear-cog, and the clutch is disposed in a single cavity formed in the gear-cog. Advantageously, the thrust plate can be flush or sub-flush with a surface of the gear-cog during use. The coupling means can comprise respective threaded portions, or a circ-clip arrangement The present invention also provides an electrically powered tool, such as a percussion hammer drill, comprising a housing in which is disposed an electric motor arranged to drive an output shaft via a gearbox, said gearbox comprising a first spindle having two or more gears fixed thereto, and a gear-cog comprising two or more gears, said gear-cog being arranged such that a first gear of the gear-cog meshes with a first gear on the first spindle when the gear-cog is in a first position, and second gear of the gear-cog meshes with a second gear on the first spindle when the gear-cog is in a second position, wherein the gear-cog is coupled to the output shaft via a clutch, and the gear-cog is slideably or fixedly disposed on the output spindle or intermediate spindle wherein all components making up the clutch are disposed in a cavity formed in the gear-cog.

Thus, a compact, easy to manufacture clutch mechanism is provided which can provide relatively consistent overload torques at which a clutch operates or ratchets.

Preferably, embodiments of the present invention may also comprise means for transmitting a drive force from a motor to an output spindle, means for interrupting the drive force when a predetermined torque force is applied to the output spindle, said clutch being slideably disposable on an output shaft of the tool, and between the output shaft and a gear cog of the tool's gearbox.

Preferably, the gear-cog can be formed from a single piece of material, preferably by a sintering method. This can simplify the manufacture of the clutch. Sintering provides consistent manufacturing tolerances required to minimise variances of torque forces required to overload clutches in a manufacturing batch. Of course, other methods of forming the gear-cog can be used, such as machining the cog from a block of material.

Preferably, the cavity formed in the gear-cog comprises a shoulder disposed between a threaded portion of the cavity and the base of the cavity, said shoulder being arranged to cooperate with a seating portion of the thrust plate.

Preferably, the present invention provides an electrically powered hammer drill, such as a percussion hammer drill, comprising a housing in which is disposed an electric motor arranged to drive an output shaft via a gearbox, said gearbox comprising a first spindle having two or more gears fixed thereto, and a gear-cog comprising two or more gears, said gear-cog being arranged such that a first gear of the gear-cog meshes with a first gear on the first spindle when the gear-cog is in a first position, and second gear of the gear-cog meshes with a second gear on the first spindle when the gear-cog is in a second position, characterised in that the gear-cog is coupled to the output shaft via a clutch, and the gear-cog slidably disposed on the output spindle. Providing a clutch which is slidably disposed on the output spindle has the advantage that the clutch can operate without hindering the hammer mechanism or operation of the drill. In other words, the output spindle can transmit impacts to a drill bit without affecting the clutch's operational characteristics.

Preferably, the clutch can be disposed in a cavity formed in the gear-cog. This provides a compact arrangement which is easy to install during manufacturing of the drill.

Preferably, the clutch can comprise one or more ball bearings arranged to be urged into one or more indentations by a spring. This provides a simple mechanical arrangement Preferably, the indentations can be formed on a surface of the gear-cog at the base of the cavity formed in the gear-cog. This provides a simple means by which the clutch can transmit a drive force from the gear-cog to the output spindle. Furthermore, it is possible to take advantage of the relatively hard material properties required for the indentation component of the clutch by forming the indentations in the gear-cog.

Preferably, the clutch can further comprise a drive plate having one or more pockets in which the one or more ball bearings are held in position, said drive plate further comprising one or more tags for engagement with one or more splines disposed on the output shaft. Thus, the drive plate can engage with output shaft splines and maintain the ball bearings in position on a raceway formed of the indentations and a surface of the gear-cog.

The present invention also provides a torque overload clutch for use in a hammer drill described above, or any other electrically powered tool, the clutch comprising means for transmitting a drive force from a motor to an output spindle, means for interrupting the drive force when a predetermined torque force is applied to the output spindle, said clutch being slideably disposable on an output shaft of the drill, and between the output shaft and a gear cog of a drill's gearbox. The clutch can also be used on other power tools such as circular saws, for example.

The present invention also provides a method of manufacturing a clutch comprising a first component for transmitting a drive force from a motor to an output spindle, and a second component for interrupting the drive force when a predetermined torque force is applied to the output spindle, the method comprising forming a gear-cog having a cavity for accommodating the first and second components, disposing the first and second components into the cavity of the gear-cog, and inserting a fastening means to hold the components in the cavity. Preferably, the fastening means is a threaded thrustplate having a threaded portion arranged to cooperate with a thread formed on the cavity of the gear-cog. Preferably the cavity comprises a shoulder arranged to engage with the thrustplate, and the thrustplate is screwed into the gear-cog's thread until a side portion of the thrustplate engages with the shoulder. This arrangement provides a simple manufacturing method. Clutches can be made using this method resulting in a relatively high degree of consistency of torque-force at which clutches in a manufacturing batch operate. In other words, the statistical variation of operating torques-forces required to operate clutches in a batch manufactured in this way is relatively low.

BRIEF DESCRIPTION OF THE DRAWINGS

Embodiments of the present invention are now described in more detail below, by way of example, and with reference to the following drawings, of which.

DETAILED DESCRIPTION OF THE INVENTION

Percussion hammer drills often have a gearbox with a speed-change mechanism therein. Thus, the power tool's output can be set to rotate at two or more speeds, according to the user's desires and/or the job in-hand. A clutch can be disposed on an intermediate shaft in the gearbox, arranged between a motor spindle and the output spindle. However, the gear reduction affects the torque at which a clutch mechanism might operate. In other words, the predetermined torque at which drive from the motor is interrupted by the clutch depends on whether the drill is operated at a relatively high or low speed; it depends on the gear ratio at which the tool is being used. This problem can be overcome by disposing the clutch between the gearbox and output shaft such that power from the motor is interrupted on the output shaft. However, disposing a clutch mechanism on the output shaft of a hammer drill poses problems particularly because of the impact vibration transmitted through the output shaft to the drill bit when the drill is operating in hammer mode.

Figure 1:
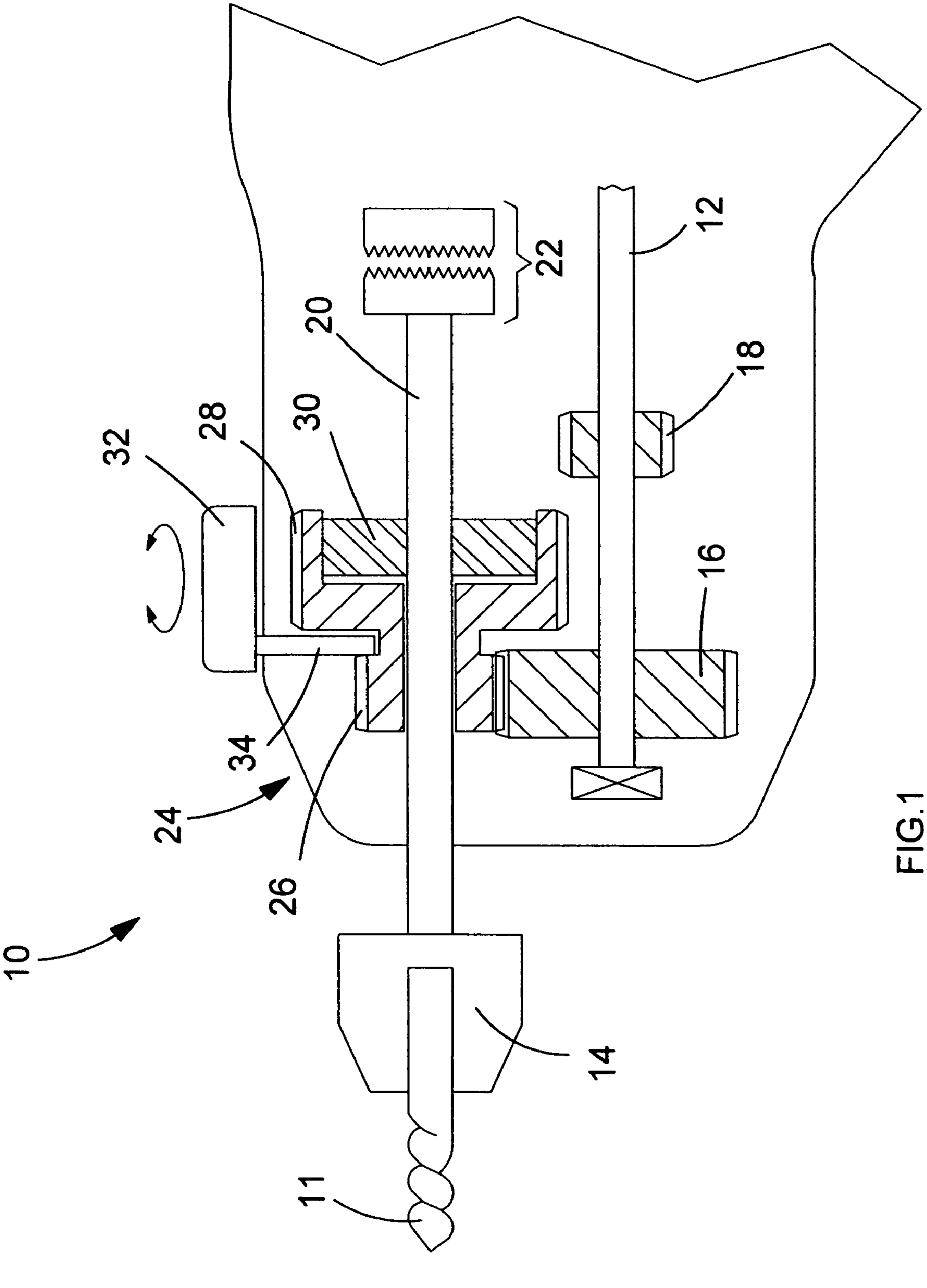
FIG. 1 is a schematic cross section diagram of components of a hammer drill embodying the present invention.

Referring to FIG. 1, which shows the percussion drill's output drive system in schematic form, a hammer drill 10 comprises a motor driven spindle 12 which has two gears disposed thereon forming a portion of a gearbox. Each of the gears is used to provide a different output speed of a chuck 14. A first gear 16 provides for high speed rotation of the chuck, whereas a second gear 18 provides for a relatively low speed rotation of the chuck 14. Each of the gears 16 and 18 are fixed to the motor drive spindle 12.

The motor spindle gears (16, 18) mesh with output spindle gear mechanism 24. The output spindle gear mechanism comprises two gears 26 and 28 which are arranged to cooperate with the motor spindle gear 16 and 18 respectively. Rotational movement of the output spindle gear mechanism is transmitted to the output spindle via a clutch mechanism 30 (which is described in more detail below). Thus, in a first position the first motor spindle gear 16 meshes with the first output spindle gear 26, and in a second position, the second motor spindle gear 18 meshes with the second output spindle gear 28.

The output spindle is moved between the first and second positions by operating a twist-lever 32. In other words, the rotational speed of the output spindle 20 can be changed by activation of the lever 32 which is moves the output spindle gear mechanism 24 between the first and second positions. As the lever is turned through 180° a pin 34 engages with the output spindle gear 24 and causes it to slide along the output spindle 20. As the output gear is moved from the first to second position the first output gear 26 disengages with the first motor spindle gear 16, and the second output gear 28 engages with the second motor spindle gear 18. In order to achieve this sliding action, the clutch mechanism 30 is arranged to be in longitudinally slideable engagement with the output spindle 20. Furthermore, in order for the clutch to operate properly, it is essential that a portion of the clutch cannot rotate with respect to the output spindle 20. Thus, the output spindle 20 has splines running longitudinally along the length of the spindle which engage with a driveplate in the clutch mechanism 30 (described in more detail below).

Figure 2:
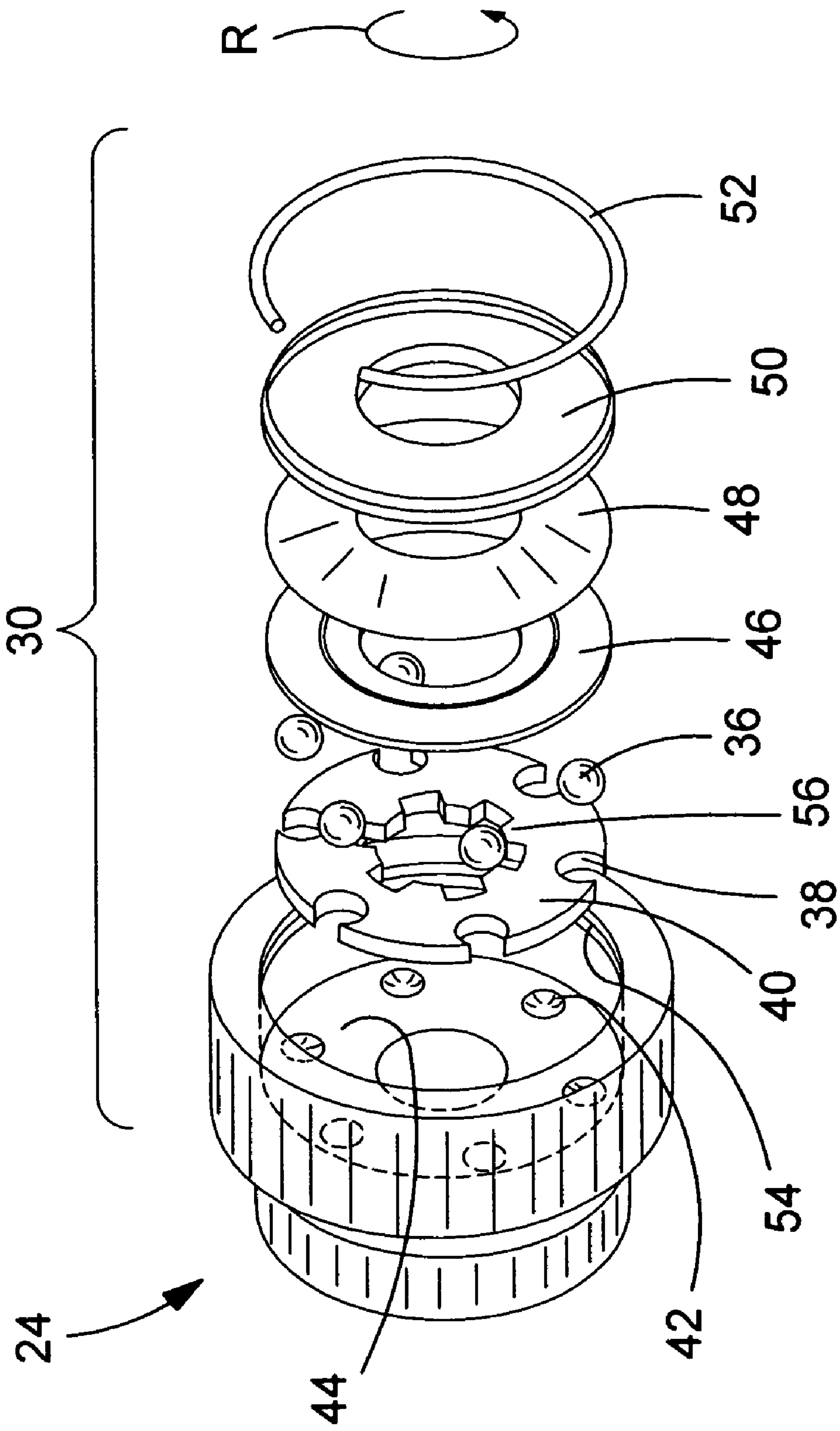
FIG. 2 is an exploded view showing components of a clutch mechanism embodying the present invention.

FIG. 2 is an exploded view of the output spindle gear mechanism 24 and the components forming the clutch 30. The clutch comprises a series of (in this case six) ball bearings 36. Each ball bearing engages in a socket 38 of a driveplate 40. The ball bearings also engage with indentations 42 arranged on an inner face 44 of the output spindle gear 24. The inner face 44 is arranged at the base of a cavity in the output spindle gear mechanism. A raceway between indentations 42 can be arranged to maintain the balls in a track. The raceway can be profiled such that the balls tend to be urged towards the indentations during use.

The balls are held in position by raceplate 46, thus forming a ball race in the bottom of a large counter bore or cavity of the output gear 24. A conical washer or spring 48 engages with the raceplate and a thrust plate 50. The thrust plate is held in position by a circular clip 52 which engages with a groove 54 disposed in the output spindle gear. Thus, the clutch mechanism is completely housed in the cavity of the output spindle gear mechanism. The thrust plate 50 urges the conical washer 48 against the raceplate 46, thereby applying a force which urges the ball bearings 36 into the indentations 42. This predetermined force has to be overcome for the clutch to interrupt the drive of the motor to the output shaft. In other words, when a torque force is applied to the output spindle 20 which is below the predetermined force the clutch transmits rotational movement from the output spindle gear 24 to the output spindle 20. However, if a torque is applied to the output spindle which exceeds the predetermined force, then the clutch ratchets causing the output spindle to rotate freely with respect to the output spindle gear.

The splined output spindle 20 engages with legs or tangs 56 arranged in the inner diameter of the driveplate 40. Thus, the spindle drives the driveplate in a rotational direction as indicated by Arrow R. Under low torque conditions, the ball bearings are urged into the indents 42 by the conical washer 48 and rotation of gear mechanism 24 causes rotation of the driveplate 40, and rotation of the output spindle 20. In other words, under low torque conditions, the output spindle gear 24 is driven by the motor output spindle gears 16 or 18 (depending on the position of the speed control lever 32). This rotational drive is transmitted to the output spindle 20 by the clutch mechanism 30. The spring force applied by the conical spring 48 is sufficient to maintain the ball bearings 36 in the indents 42. Thus, the driveplate 40 rotates at the same speed as the spindle output gear, causing the spindle output to rotate likewise. But if a torque force is applied to the output spindle which exceeds the force applied by the conical washer then the ball bearings ride out of the indentations and the output spindle gear 24 rotates with respect to the driveplate 40. In this manner, the drive from the motor to the tool 11 is interrupted.

The chuck 14 is disposed on an output spindle 20. Hammering action of the output spindle 20 is achieved by utilising a percussion hammering mechanism 22, which is of a standard design. As a result, the output spindle moves in its longitudinal direction when the hammering action mechanism is engaged and causes a drill bit 11 to move rapidly in the longitudinal direction. Of course, alternative hammer mechanism could be used, such as pneumatic mechanisms.

Figure 3:
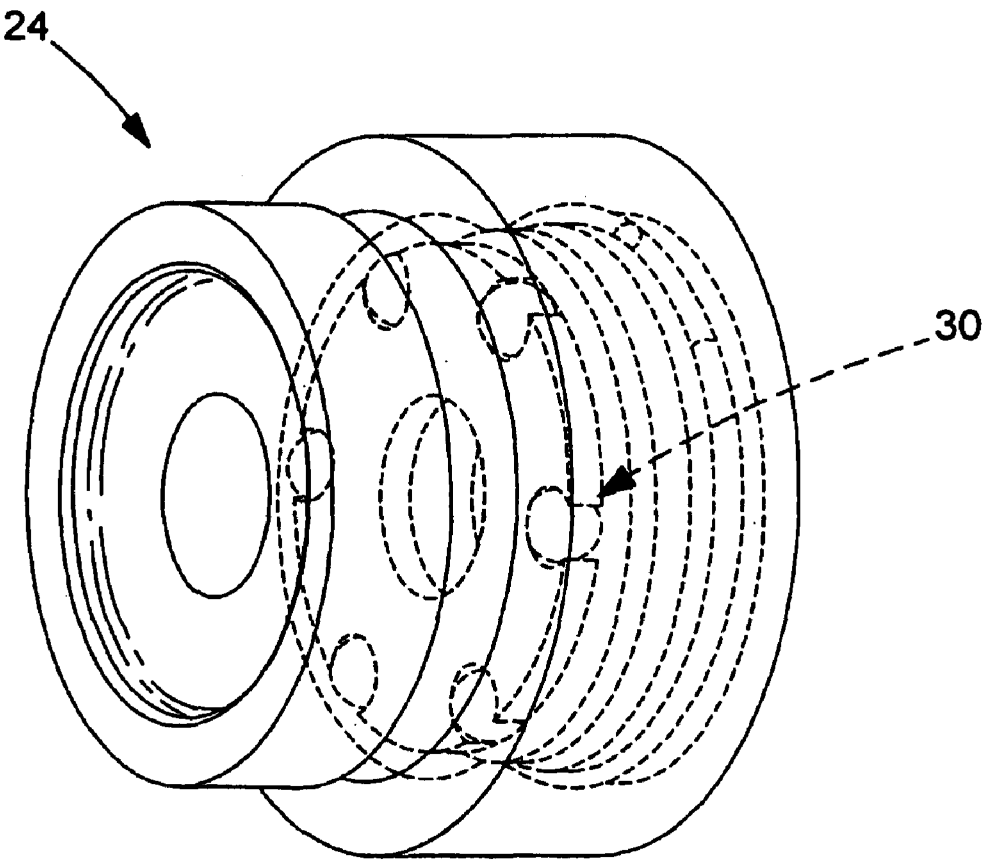
FIG. 3 is a view of the clutch mechanism disposed in a gear cog.

FIG. 3 shows the clutch mechanism disposed in the cavity of the output spindle gear mechanism 24. It is appreciated that the clutch is wholly accommodated within the gear 24. Thus, a considerable space saving is achieved.

Figure 4:
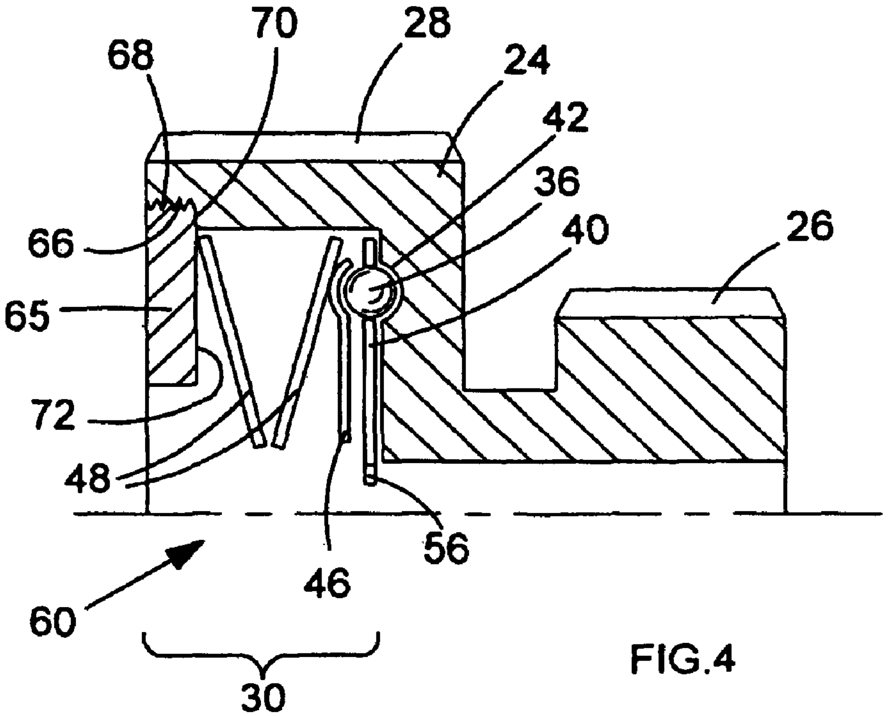
FIG. 4 is a schematic partial cross-section of an alternative clutch mechanism embodying the present invention.

In an alternative, or second embodiment, the circ-clip 52 and groove 54 can be replaced by a threaded thrust-plate having a threaded portion arranged to cooperate with a like-threaded portion of the gear mechanism 24. This second embodiment is shown in schematic form in FIG. 4 where the same numerals have been used to indicate components common to the embodiment previously described.

The components 30 of the clutch are located in a recess 60 formed in the gear mechanism 24. As described previously, the clutch balls 36 are located in a track or raceway 42 formed on the inner face 44 of the gear mechanism 24. A raceplate 46 holds the balls in position. One or more conical springs 48 are arranged to urge the raceplate against the balls, and hence the balls into the raceway or indentations 42.

The springs are held in position by a thrustplate 65. The thrustplate has a threaded portion 66 which engages with a thread 68 cut into the gear mechanism's cavity 60. The cavity has a step or shoulder 70 against which the underside 72 of the thrustplate 65 engages when the thrustplate is threaded into position. Thus, the step 70 acts as a seat against which the thrustplate 65 is threaded down onto. In this way, a more consistent compression of the springs 48 can be achieved between devices in a manufacturing batch.

Furthermore, the threaded thrustplate arrangement provides a safer means to manufacture a clutch according to this embodiment because the springs are compressed as the thrustplate is threaded into the gear. By comparison, the first embodiment requires the springs to be under compression as the circ-clip is inserted in to the groove. If the circ-clip does not locate properly, the springs might force the circ-clip out of engagement with the groove causing components to spring-out of the gear at relatively high velocities. This may result in damage to machinery or injury to an operative.

The outer surface of the threaded thrustplate can be arranged so that it is flush with the gear mechanism 24 when threaded into position against the step 70. Thus, a compact clutch and gear mechanism can be achieved.

By disposing the torque overload clutch on the output spindle gear 24, it is possible for the clutch to interrupt the drive to the output spindle at a consistent predetermined torque. In other words, it is not necessary to compensate for the differences in torque applied by the motor as a result of different output speeds of the drill.

The gear mechanism 24 can be formed from a single piece of material. The cavity and raceway or indentation into which the clutch's balls locate can be formed by a sintering method. In the second embodiment the step might also be formed by a sintering method. This provides a means for mass-producing a clutch mechanism with relatively high tolerances thus reducing any variance of overload force needed before the clutch ratchets. In other words, the standard deviation of forces required to overload clutches in a manufacturing batch can be reduced because the manufacturing tolerances are reduced using these techniques.

Furthermore, by utilising a single-piece gear-cog, a clutch of the prior art is simplified and improved upon. For instance, the clutch described in DE2522446 has various drive components press fitted onto the central spline or onto a gear. Thus, the torque range in which the clutch can operate is limited; if the torque exceeds a given amount, then the components press-fitted to one another might be caused to slip or move with respect to each other. This can be overcome by increasing the friction between press fitted components, but this requires larger, thicker components to deal with the additional forces involved.

The manufacturing method for such a clutch is relatively simple. The components of the clutch are assembled in the gear-cog cavity in the appropriate order and finally the circclip inserted to hold the components in place. In the second embodiment shown in FIG. 4, the thrustplate 65 is tightened down to engage the shoulder 70 by screwing the thrustplate into the threaded portion 68 of the gear-cog.

Alternative arrangements are apparent to the skilled person. For instance, the conical springs can be replaced by other forms of springs, such as coil springs, for instance. Furthermore, other types of clutch mechanism might b considered other than the ball-and-socket arrangement described above. For instance, a plate having a series of teeth which engage with similar teeth on a reciprocal plate might be used. This arrangement can reduce the number of components in the clutch. The raceplate 46 in the second embodiment might be replaced with a flat washer. The thickness of the washer can be increased so that the torque at which the clutch operates can be increased without increasing the overall dimensions of the clutch. Yet further, the threaded portion of the thrustplate and the gear-cog in the second embodiment could be replaced with a bayonet-type fitment, or the like.

The invention claimed is:

1. An electrically powered tool comprising:

a housing;

a motor disposed in the housing;

a drive shaft in rotatable engagement with the motor;

a drive gear located on and rotatable by the drive shaft;

an output spindle having a first axial end and a second axial end;

an output gear disposed on and rotatable relative to the output spindle, the output gear including an interior surface at least partially defining a cavity including an opening, and the interior surface including a first torque transmitting surface;

a thrust plate fixed relative to the output gear;

a first clutch plate located around the output spindle and inside the cavity between the thrust plate and the first torque transmitting surface, the first clutch plate in axially slidable and rotatable driving engagement with the output spindle, and including a second torque transmitting surface; and a clutch spring located in the cavity between the thrust plate and the first clutch plate and arranged to maintain the first torque transmitting surface in driving engagement with the second torque transmitting surface gear when torque is less than a predetermined threshold.

2. An electrically powered tool according to claim 1 wherein the output spindle includes an axially extending groove, and the first clutch plate is an annular disc including a radially inward extending tang, and the tang projects into the groove to maintain the first plate in axially slidable and rotatable driving engagement with the output spindle.

3. An electrically powered tool according to claim 1 further comprising a clutch ball located in the cavity and arranged to transmit torque between the first torque transmitting surface and the second torque transmitting surface.

4. An electrically powered tool according to claim 3, wherein the first torque transmitting surface comprises a concave indentation.

5. An electrically powered tool according to claim 4, wherein the second torque transmitting surface comprises an at least partially circular cutout defined by the first clutch plate and dimensioned to hold the clutch ball.

6. An electrically powered tool according to claim 5, wherein when the torque is less than the predetermined threshold the clutch ball resides partially in the concave indentation and partially in the cutout for transmitting torque between the output gear and the first clutch plate.

7. An electrically powered tool according to claim 6 and further comprising a race plate located in the cavity and including a first face in contact with the clutch spring and an opposite second face in rollable contact with the clutch ball.

8. An electrically powered tool according to claim 1 wherein the thrust plate is threadably engaged with the output gear.

9. An electrically powered tool according to claim 1, wherein the clutch spring comprises a cone washer.

* * * * *